(12) United States Patent
Goy et al.

(10) Patent No.: US 11,859,564 B2
(45) Date of Patent: Jan. 2, 2024

(54) SMART FUEL SUPPLY SYSTEM

(71) Applicant: Hamilton Sundstrand Corporation, Charlotte, NC (US)

(72) Inventors: Edward W. Goy, Crystal Lake, IL (US); Ryan Shook, Loves Park, IL (US); Benjamin T. Harder, Sycamore, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/719,060

(22) Filed: Apr. 12, 2022

(65) Prior Publication Data

US 2023/0265800 A1     Aug. 24, 2023

Related U.S. Application Data

(60) Provisional application No. 63/311,827, filed on Feb. 18, 2022.

(51) Int. Cl.
*F02C 9/26* (2006.01)
*F02C 9/30* (2006.01)

(52) U.S. Cl.
CPC ............. *F02C 9/263* (2013.01); *F02C 9/30* (2013.01)

(58) Field of Classification Search
CPC .... F02C 9/26; F02C 9/263; F02C 9/28; F02C 9/30; F02C 9/46; F02C 7/22; F02C 7/232; F02C 7/236; F05D 2270/30; F05D 2270/301; F05D 2270/306; F04B 49/08; F04B 49/20; F04B 49/22
See application file for complete search history.

(56) References Cited

U.S. PATENT DOCUMENTS

| | | | |
|---|---|---|---|
| 3,695,038 A * | 10/1972 | Greiner | F02C 9/32 60/39.281 |
| 6,065,946 A | 5/2000 | Lathrop | |
| 6,487,847 B1 * | 12/2002 | Snow | F02K 3/10 60/764 |
| 6,652,249 B2 | 11/2003 | Kenney et al. | |
| 7,204,076 B2 | 4/2007 | Griffiths et al. | |

(Continued)

FOREIGN PATENT DOCUMENTS

| | | |
|---|---|---|
| CN | 1614232 A | 5/2005 |
| EP | 3712415 A1 | 9/2020 |
| FR | 2831209 B1 | 4/2003 |

OTHER PUBLICATIONS

European Search Report for EP Application No. 23153283.9 dated Jul. 7, 2023.

*Primary Examiner* — Loren C Edwards
(74) *Attorney, Agent, or Firm* — Carlson, Gaskey & Olds, P.C.

(57) ABSTRACT

A fuel supply system includes a pump to be connected to a fuel tank. A metering valve is downstream of the pump. A control is programmed to control at least one of the pump and metering valve. The control is operable to take in a flow demand signal and a fuel pressure signal from a controller associated with a gas turbine engine. The flow demand signal is indicative of a desired flow volume and the fuel pressure signal is indicative of a desired fuel pressure. Operation conditions are identified for the at least one of said pump and the metering valve. A gas turbine engine and fuel supply system is also disclosed.

8 Claims, 3 Drawing Sheets

(56) References Cited

U.S. PATENT DOCUMENTS

| | | |
|---|---|---|
| 2007/0130911 A1* | 6/2007 | Goldberg ................. F02C 9/30 |
| | | 60/39.281 |
| 2009/0235665 A1 | 9/2009 | Druhan |
| 2011/0023444 A1* | 2/2011 | Veilleux, Jr. ............ F02C 7/222 |
| | | 60/734 |
| 2012/0156061 A1 | 6/2012 | Baker et al. |
| 2012/0219429 A1 | 8/2012 | Heitz |
| 2021/0262899 A1 | 8/2021 | Goy et al. |
| 2021/0285384 A1 | 9/2021 | Rhoden et al. |

\* cited by examiner

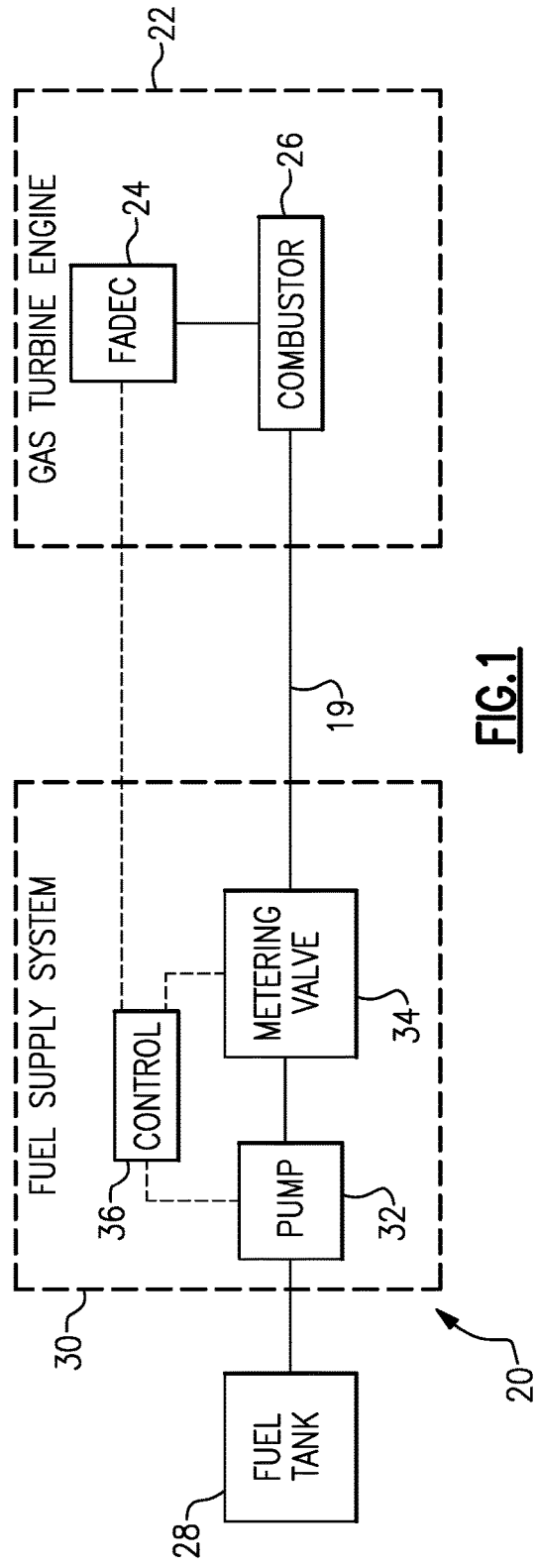
FIG.1
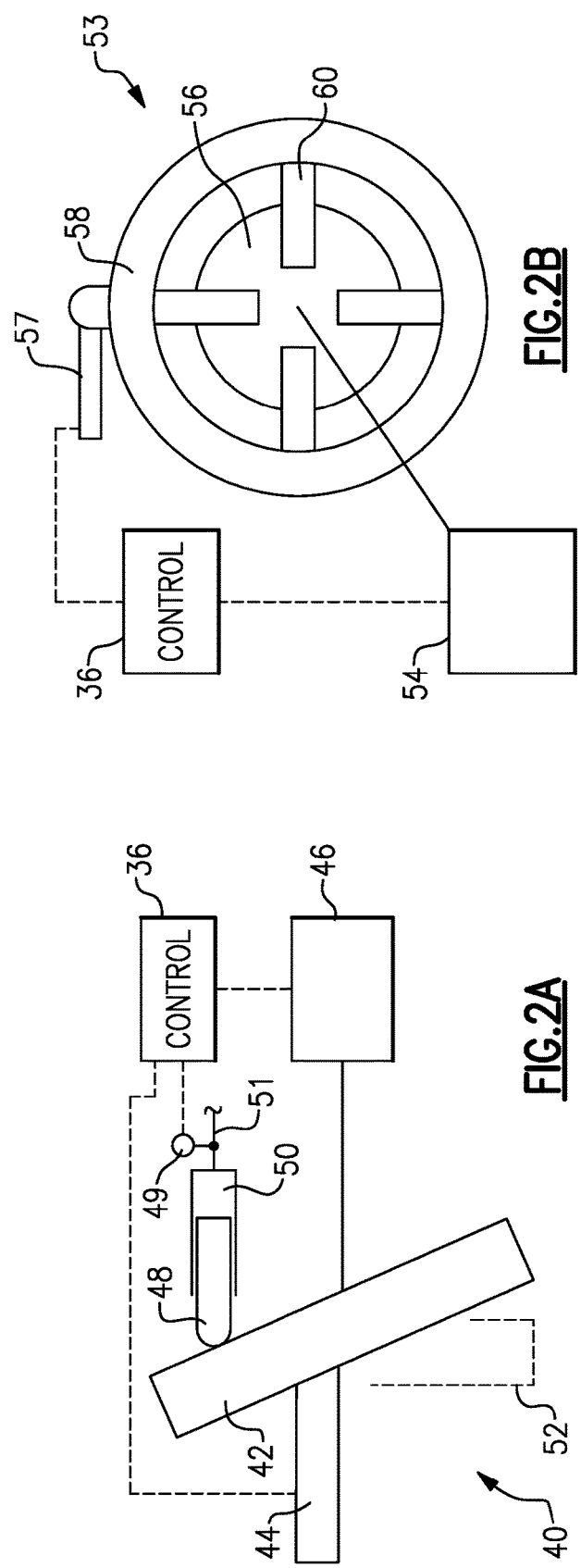
FIG.2B
FIG.2A

SMART FUEL SUPPLY SYSTEM

CROSS-REFERENCE TO RELATED APPLICATION

This application claims priority to U.S. Provisional Patent Application No. 63/311,827 filed on Feb. 18, 2022.

BACKGROUND

This application relates to calibration information integrated into a dedicated control for a fuel supply system.

Gas turbine engines are typically provided with a fuel supply system that sends fuel to a combustor on the gas turbine engine. Gas turbine engines are also provided with a full authority digital electronic controller ("FADEC").

The FADEC historically has provided demand information to the fuel supply system such that a desired volume of flow of fuel is sent to a combustor on the gas turbine engine and at a desired pressure. The FADEC is programmed to directly control a pump and/or metering valve in the fuel metering unit.

At times different manufacturers may manufacture the fuel supply system and the gas turbine engine.

SUMMARY

A fuel supply system includes a pump to be connected to a fuel tank. A metering valve is downstream of the pump. A control is programmed to control at least one of the pump and metering valve. The control is operable to take in a flow demand signal and a fuel pressure signal from a controller associated with a gas turbine engine. The flow demand signal is indicative of a desired flow volume and the fuel pressure signal is indicative of a desired fuel pressure. Operation conditions are identified for the at least one of said pump and the metering valve.

An engine with a fuel supply system is also disclosed.

These and other features will be best understood from the following drawings and specification, the following is a brief description.

BRIEF DESCRIPTION OF THE DRAWINGS

FIG. 1 schematically shows a gas turbine engine and fuel system.

FIG. 2A shows a first embodiment pump.

FIG. 2B shows a second embodiment pump.

DETAILED DESCRIPTION

Figure 2C:
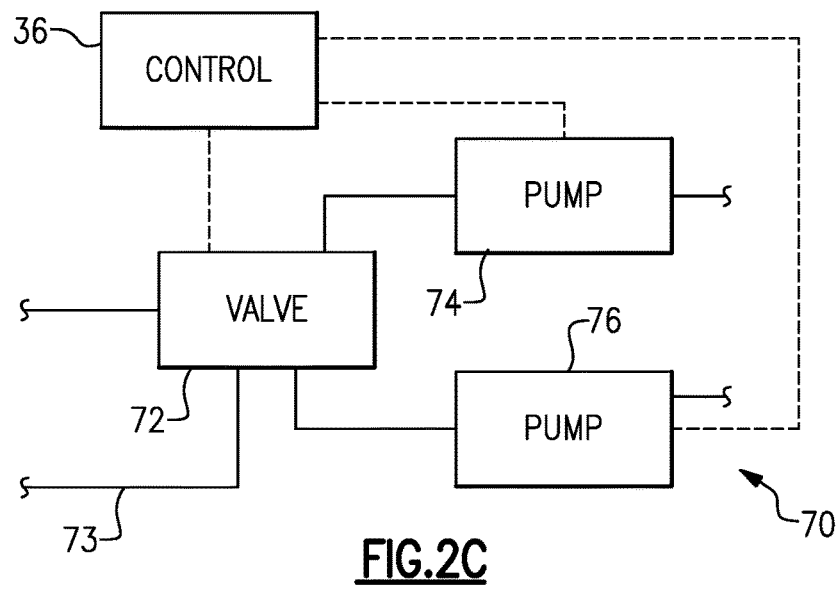
FIG. 2C shows a third embodiment pump.

FIG. 1 shows a system 20 that incorporates a gas turbine engine 22. The gas turbine engine 22 has a full authority digital electronic controller ("FADEC") 24 that controls all aspects of the engine including its combustor 26. The gas turbine engine controller 24 takes signals from a plurality of components on the gas turbine engine and identifies a desired flow demand and fuel pressure dependent on conditions at the gas turbine engine. The FADEC 24 communicates with a fuel supply system 30 to demand a desired flow volume of fuel and at a desired pressure.

Fuel tank 28 supplies fuel to a fuel pump 32 in the fuel supply system 30. Downstream of the pump 32 is a metering valve 34. A control 36, which is part of the fuel supply system 30, controls the pump 32 and the metering valve 34 such that a desired volume flow of fuel reaches a line 19 leading to the combustor 26. Moreover, the control 36 controls the pump 32 and metering valve 34 such that the fuel in line 19 is at a desired pressure.

In a feature of this disclosure, the FADEC only provides the desired volume flow and pressure to the control 36. The control 36 is programmed to control a variable displacement pump 32 and the metering valve 34 such that the desired volume and pressure are achieved in line 19. The control is supplied by the supplier of the fuel supply system 30, and is calibrated by the supplier of the pump 32 and metering valve 34. In this manner, improved accuracy is achieved.

FIG. 2A shows a first embodiment variable displacement pump 40. Pump 40 incorporates a swash plate 42 having an actuator 44 that can change the eccentricity of the swash plate 42 relative to a reciprocating axis of a pump piston 48. The swash plate 42 is shown at a large volume flow position. However, the actuator 44 can adjust the position of the swash plate to a smaller volume position such as shown in phantom at 52. The piston 48 moves within a cylinder 50 to supply fuel to a downstream line 51. Although a single piston 48 is illustrated, in practice, there may a plurality of circumferentially spaced pistons 48. A motor 46 drives the swash plate 42 to rotate. A sensor 49 senses the pressure and/or volume of the fuel at line 51.

The control 36 receives signals from the sensor 49, and operates to control the actuator 44 and motor 46 such that the swash plate 42 is operated at a desired speed and at a desired eccentricity to provide the desired flow volume and pressure to the line 51. The pump 40 is shown somewhat schematically, as the operation of a swash plate piston pump is known.

FIG. 2B shows another embodiment pump 53. Variable displacement pump 52 is a vane pump, having a motor 54 driving a rotor 56. As known, a plurality of vanes 60 are driven to move along an inner surface of a liner 58 to move fuel from an inlet to an outlet. The liner 58 has an actuator 57 such that the eccentricity of the liner 58 relative to a rotational axis of the rotor 56 can be controlled. In this manner the displacement of the pump can be controlled. This is shown schematically, as vane pumps are well known.

Control 36 is shown here communicating with actuator 57 and motor 54 to provide the desired volume flow and pressure downstream of the pump 52.

While the sensor is not illustrated here, a sensor such as shown in FIG. 2A may be provided to communicate signals back to the control 36.

FIG. 2C shows another embodiment 70. Embodiment 70 includes a sharing valve 72 communicating flow to two pumps 74 and 76. While two pumps are shown, of course other plural numbers of pumps may be utilized. Pump 74 and 76 may be fixed displacement pumps. Sharing valve 72 may also send fuel into a bypass line 73 leading back to a fuel tank.

The control 36 controls the valve 72 and the speed of the pumps 74 and 76 to provide a desired volume of flow downstream of the pump 74 and 76 to the combustor and at a desired pressure. Here again, the operation of such system generally is known. It is the use of the controller having calibration information to control the valve 72 and pump 74/76 which is part of this disclosure.

While the sensor is not illustrated here, a sensor such as shown in FIG. 2A may be provided to communicate signals back to the control 36.

Figure 3A:
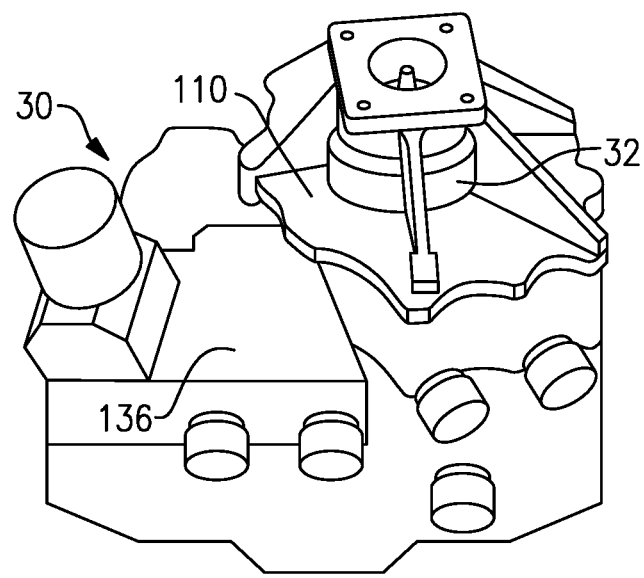
FIG. 3A shows a fuel supply system.

As shown in FIG. 3A, the fuel supply system 30 is a "line replaceable" unit. That is, the fuel supply system is received within a single housing 110 that can be removed as a unit. The pump 32 is shown as well as a cover plate 136.

Figure 3B:
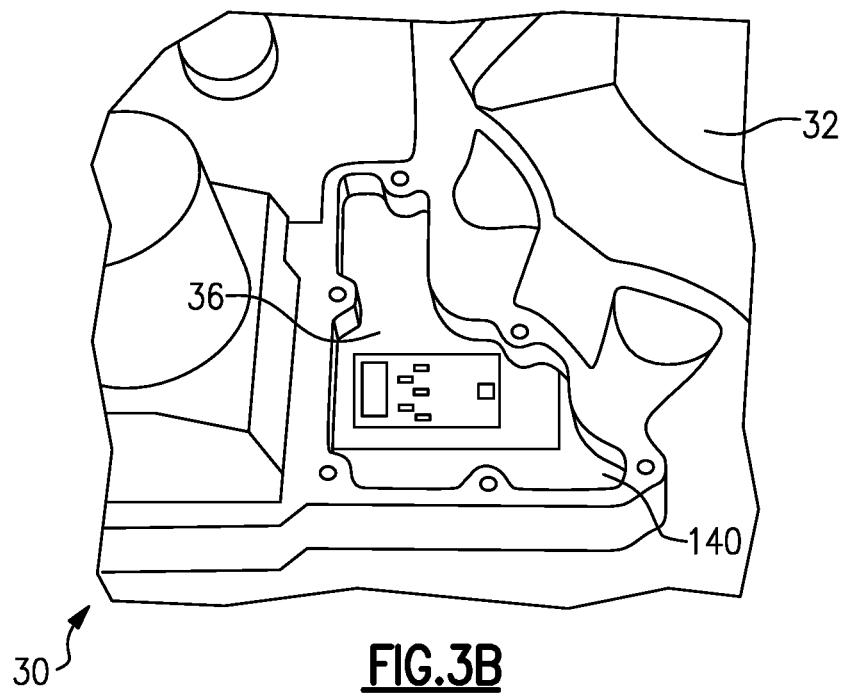
FIG. 3B shows a fuel supply system with a cover removed.

In FIG. 3B the cover plate 136 is removed and one can see the control 36 is received within a compartment 140 in the line replaceable fuel metering unit 30.

Figure 4:
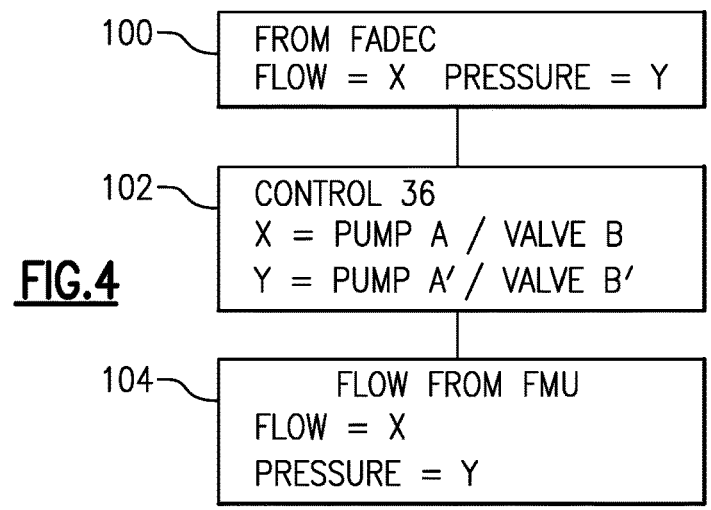
FIG. 4 is a flow chart of control features associated with this disclosure.

FIG. 4 shows a flow chart. At step 100 a signal is received from a FADEC, and that signal is FLOW=X, PRESSURE=Y.

At step 102 the control 36 receives this signal and is programmed and calibrated to recognize that to achieve the flow X the pump should operate at condition A and the valve should operate at condition B. The control 36 is also calibrated to know that to achieve the pressure Y the pump should be operated at condition A' and the valve operated at condition B'.

At step 104, the flow downstream of the fuel supply system will be such that the flow will equal X and the pressure will equal Y.

In sum, by moving the specific control for the fuel supply system to a dedicated controller the accuracy of the fuel downstream of the fuel supply system meeting the demanded flow and pressure requirements will be improved.

Figure 5:
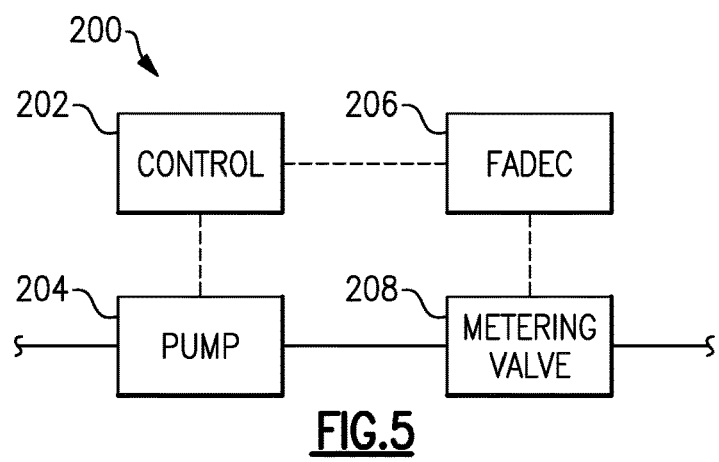
FIG. 5 shows another embodiment.

FIG. 5 shows another embodiment 200. In embodiment 200, a local control 202 controls a pump 204, similar to the FIG. 1 embodiment. However, control 202 still receives signals from the FADEC 206. However, the FADEC 206 directly controls the metering valve 208 in this embodiment.

A fuel supply system includes a pump to be connected to a fuel tank. A metering valve is downstream of the pump. A control is programmed to control at least one of the pump and metering valve. The control is operable to take in a flow demand signal and a fuel pressure signal from a controller associated with a gas turbine engine. The flow demand signal is indicative of a desired flow volume and the fuel pressure signal is indicative of a desired fuel pressure. Operation conditions are identified for the at least one of said pump and the metering valve to achieve the desired flow volume and the desired fuel pressure.

Although embodiments have been disclosed, a worker of skill in this art would recognize that modifications would come within the scope of this disclosure. For that reason the following claims should be studied to determine the true scope and content of this disclosure.

What is claimed is:

1. A combined gas turbine engine and fuel supply system comprising:

a gas turbine engine including a combustor and an engine controller, said engine controller taking signals from a plurality of components on the gas turbine engine and identifying a desired flow demand and a desired fuel pressure dependent on conditions at the gas turbine engine;

the engine controller being operable to send a flow demand signal indicative of the desired flow demand and a fuel pressure signal indicative of the desired fuel pressure to a fuel supply system control in a fuel metering unit;

the fuel supply system including a pump connected to a fuel tank, a metering valve downstream of said pump; and said fuel supply system control separate from the engine controller and programmed to control at least one of said pump and said metering valve, said fuel supply system control operable to take in the flow demand signal and the fuel pressure signal from the engine controller, and identify operation conditions for said at least one of said pump and said metering valve to achieve the desired flow volume and the desired fuel pressure; and said pump including a motor, and the fuel supply system control further being programmed and operable to control the motor to achieve a desired speed of the pump.

2. The combined gas turbine engine and fuel supply system as set forth in claim 1, wherein said fuel supply system is line replaceable and is received within a housing.

3. The combined gas turbine engine and fuel supply system as set forth in claim 2, wherein said pump is a variable displacement pump.

4. The combined gas turbine engine and fuel supply system as set forth in claim 3, wherein said variable displacement pump is a piston pump.

5. The combined gas turbine engine and fuel supply system as set forth in claim 3, wherein said variable displacement pump is a vane pump.

6. The combined gas turbine engine and fuel supply system as set forth in claim 1, wherein said fuel supply system includes a sharing valve and a plurality of pumps.

7. The combined gas turbine engine and fuel supply system as set forth in claim 1, wherein the fuel supply system control controls the said pump based upon the flow demand signal and the fuel pressure signal from the engine controller, and the engine controller directly controlling the metering valve.

8. The combined gas turbine engine and fuel supply system as set forth in claim 1, wherein the fuel supply system control is an electronic control.

* * * * *